Patented July 6, 1948

2,444,802

UNITED STATES PATENT OFFICE 2,444,802

NITROGENOUS RESINS CONTAINING ALKYLENE SULFONATE GROUPS

Robert W. Auten, Jenkintown, and James L. Rainey, Abington, Pa., assignors to The Resinous Products & Chemical Company, Philadelphia, Pa., a corporation of Delaware No Drawing. Application July 28, 1945,
Serial No. 607,652

6 Claims. (Cl. 260—70)

This invention relates to a new kind of nitrogenous thermosetting resin. It relates to the preparation of condensation products of aldehydes and carbamides, said condensates containing salt-forming sulfoalkoxy groups.

In accordance with this invention, thermosetting resinous products containing salt-forming sulfoalkoxy methylene groups are prepared by reacting together one or more aldehydes, one or more carbamides, and a water-soluble salt of a hydroxyalkane sulfonic acid under conditions such that condensation occurs with the formation of a resinous product. During the condensation, the salt of the hydroxyalkane sulfonic acid takes part in the reaction with the result that the final condensate contains salt-forming sulfoalkoxy groups.

In the process of this invention, the carbamide and aldehyde react to form alkylol derivatives of the carbamide. For example, urea reacts with formaldehyde to form dimethylolurea. The alkylol derivative then reacts by etherification with the hydroxyalkane sulfonate, and, at the same time, the product polymerizes by condensation to a resinous condition. For example, dimethylolurea may react with sodium isethionate (HOC$_2$H$_4$—SO$_3$Na) so that the hydroxyl groups become etherified, groups having the structure —C$_2$H$_4$SO$_3$Na are added, and the entire mass condenses to a resin which has very unusual properties.

Carbamides which may be used include urea, thiourea, guanidine, and monoacyl, monoalkyl, monoaryl, and monoaralkyl ureas. While urea is much the preferred carbamide, it is to be understood that it may be replaced at least in part by other carbamides. The operable carbamides have at least three amino-hydrogen atoms available for reaction with the aldehyde and are commonly referred to as having a functionality greater than two.

The aldehydes which may be employed include formaldehyde, benzaldehyde, acetaldehyde, butyraldehyde, and furfuraldehyde, and mixtures of two or more aldehydes, such as formaldehyde and acetaldehyde; formaldehyde and benzaldehyde; acetaldehyde and furfuraldehyde; formaldehyde, benzaldehyde, and furfuraldehyde, and the like. In the production of certain resins within the scope of this invention, formaldehyde is the aldehyde of first choice. While, in such cases, it is preferred that the formaldehyde be in solution, as in formalin, it may also be used in its polymeric forms, e. g., paraformaldehyde, or at least in part in a form such as hexamethylene tetramine and formals which yield formaldehyde under the conditions of the reaction.

The salts of the hydroxyalkane sulfonates include those in which the alkylene group contains two, three, or four carbon atoms. They have the general formula HO—R—SO$_3$M, in which R represents an ethylene, propylene, or butylene group and M is an equivalent of a metal. These are conveniently made by the reaction of an alkylene oxide, i. e. ethylene, propylene, or butylene oxide, with a bisulfite of an alkali metal. The reaction is typified by the following equation:

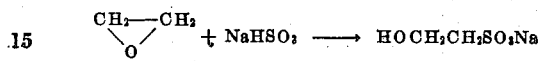

The water-soluble salts of the alkali metals, especially those of sodium, are ordinarily preferred, although any water-soluble metal salt may be employed. Even those salts which are very low in solubility can be used, since more of the salt dissolves as the dissolved portion reacts with the alkylol derivative.

The ratio of the reactants may be varied widely, depending upon the type of product desired. Each reagent, as well as the amount used thereof, contributes to the final properties of the product. For example, the ratio of aldehyde to carbamide is of major importance. While two mols of aldehyde may react theoretically with each amino group, it is customary to use much lower ratios in order to obtain resins which convert more rapidly to the infusible stage. Accordingly, the preferred ratio of aldehyde is about 1.0 to about 1.5 mols per amino group, or, in the case of urea-aldehyde resins, a ratio of 2 to 3 mols of aldehyde per mol of urea.

Of equally great importance is the proportion of the hydroxyalkane sulfonate which is used. Upon the ratio so used depends the number of substituent groups which are introduced into the resin molecule, and upon this number depend important properties of the resin. While it is theoretically possible to react as much as one molecule of the hydroxy sulfonate per mol of aldehyde, it is preferred that a much lower ratio be used. The lower limit of the amount of hydroxyalkane sulfonate which may be used is 0.05 mol per mol of aldehyde, and the practical upper limit is 0.5 mol per mol of aldehyde. The preferred range which has proven to be eminently satisfactory is between 0.1 and 0.4 mol per mol of aldehyde.

In the preparation of the resinous products of this invention, the preferred method is that described above, wherein the aldehyde is first reacted with the carbamide to form an alkylol derivative which, in turn, is reacted under the influence of heat with a hydroxyalkane sulfonate. In the latter step of the process, polymerization by condensation also occurs, and this reaction may be continued until the resin becomes extremely viscous and is ultimately converted to an infusible and relatively insoluble product.

Alternatively, the hydroxy sulfonate and the aldehyde may be reacted together first and then mixed and reacted with the carbamide. In another method, the three reactants may be mixed at the outset and thereafter heated to effect reaction, including condensation.

There are apparently two reactions which proceed simultaneously—one, the condensation of the resinous product, which is accelerated by a lowering of the pH of the reaction mixture and which is manifested by an increase in viscosity, and the other, the reaction of the methylol intermediate and hydroxy sulfonate, resulting in the addition of sulfoalkoxy groups.

It is advisable to limit the temperature and pH of the reaction mixture so that the condensation and polymerization of the resin, which are favored by high temperature and low pH, do not proceed too rapidly to the exclusion of the etherification reaction.

The range of pH which assures satisfactory results is 4 to about 7. Resins have been prepared at a pH as low as 3, but results are unsatisfactory due to the tendency of the condensation reaction to proceed too rapidly, resulting in the ultimate gelation of the resin. At a pH substantially above 7, the etherification reaction as well as the condensation tends to be sluggish, and it is, therefore, recommended that the pH be maintained between about 4 and about 7.

Usually, at a given pH, the rate of condensation may be controlled by regulating the temperature. Preferably, temperatures above 60° C. are employed, and the upper limit is ordinarily the boiling point of the reaction mixture. This boiling point will depend upon the external pressure, the presence of dissolved salts, and similar factors. For the most part, it is convenient to operate at atmospheric pressure and at a temperature approximating 105° C., the point at which water is distilled from the reaction mixtures at normal atmospheric pressure.

The reaction may be carried to any desired end point, depending upon the intended use of the product. As the reaction continues, the viscosity of the reaction mixture progressively increases. For this reason, viscosity is a valuable index of the extent of reaction, and the resin is ordinarily condensed until a 50% solution of it in water has a viscosity above 0.5 poise at room temperature. A viscosity of about 1–4 poises is preferred and is very satisfactory when the resin is to be used for impregnating purposes.

The product may be used as the solution of the reaction product, or it may be concentrated or dried. Drying may be accomplished by conventional methods such as heating, with or without vacuum, drum-drying, or spray-drying. Since the product is thermosetting, care must be exercised, when a soluble product is desired, to conduct the drying so as to avoid converting the material to an infusible and insoluble condition. A properly dried resin is extremely stable and may be stored for a period of months without loss in solubility.

The following examples are for purposes of illustration:

*Example 1*

Into a three-necked flask, equipped with a thermometer, reflux condenser, and mechanical stirrer, was placed 186 grams of a 37% aqueous solution of formaldehyde (equivalent to 2.3 mols HCHO). The pH of the formaldehyde solution was adjusted to 7.0 (brom thymol blue) with a 10% solution of sodium carbonate. Sixty grams (one mol) of urea was added. The mixture was stirred and then heated to 80° C. and maintained at 80° C. for fifteen minutes. Then 34 grams (0.23 mol) of solid sodium isethionate, $$HOC_2H_4SO_3Na$$

was added. The pH was adjusted to 5.0–5.5 (Beckman pH meter) by means of 50% formic acid solution and then heated to refluxing temperature and held at that temperature until a viscosity of L on the Gardner-Holdt scale at 25° C. was obtained for the solution, which at that time had a resin content of 53.1%. The resinous solution was then cooled to 30° C. and adjusted to a pH of 7.0–8.0 (Beckman pH meter) with 10% aqueous sodium carbonate solution.

The product was a clear, amber-colored, resinous solution which could be diluted indefinitely with water at 25° C. without precipitation. A solution of 10% resin in water did not show any turbidity when cooled to 16° C. In comparison, an unmodified urea-formaldehyde resin of the same formaldehyde content, prepared at the same pH and temperature in the same way, not only had a lower viscosity but would tolerate only about two grams of water per gram of resin at 25° C. without becoming turbid. Furthermore, a 10% solution of the unmodified resin was clear only above 35° C.

*Example 2*

Sheets of paper were made from kraft pulp by following the procedure of T. A. P. P. I. specification T–205–M–36. These served as standards or blanks. Other sheets were made in an identical manner except that the resin of Example 1 was added to the pulp in the beater to the extent of 3% resin solids on the weight of the dry pulp. Finally, for comparative purposes, sheets were made in the same way except that 6% urea-formaldehyde resin solids, based on the dry pulp, was added to the beater. Below is a comparison of the tensile strength of the three kinds of sheets when measured dry and wet on a Scott IP–4 testing machine and corrected to a forty-five pound per ream basis:

|  | Dry Tensile | Wet Tensile | Wet Tensile As Percent of Dry |
|---|---|---|---|
|  |  |  | *Percent* |
| Paper free of resin | 15.7 | 1.5 | 10 |
| Paper treated with 6% urea resin | 17.5 | 2.8 | 16 |
| Paper treated with 3% resin of Example 1 | 20.8 | 5.3 | 25 |

The advantage of the resin of this invention over an ordinary urea-formaldehyde resin is apparent.

The products of this invention have distinctive properties and a wide variety of uses. They are thermosetting and can be converted to the infusible stage by means of heat or by the catalytic action of acidic agents. Of outstanding importance is the fact that such products are soluble in all proportions in water and have varying solubilities in many hydroxylated solvents. This high degree of solubility is retained even when the resins are unusually highly condensed. As the example above indicates, the products of this invention at a given degree of condensation have much greater solubility in, and tolerance for, water than do the usual urea-formaldehyde resins of approximately the same degree of condensation. Conversely, at the same degree of solubility, the products of this invention may be much more highly condensed than the usual urea-formaldehyde resins. Furthermore, solutions of the products of this invention are far more stable than corresponding solutions of the usual urea-formaldehyde resins. This is of real importance and value. For example, two chief disadvantages of using solutions of urea-formaldehyde resins in the past have been (a) the tendency of the resin to precipitate when the solution is diluted and (b) the tendency of the resin in solution to increase rapidly in viscosity, even at room temperature, to the point where the entire solution gels to an unusable condition. This lack of stability is reflected in the custom of dating commercial shipments of solutions of such resins and combining a warning that the resin should be used within a certain period, say three months, and/or that the solution be stored in a cool place.

Both of these disadvantages are overcome when products as herein described are employed. The products which comprise this invention have excellent stability and exceptional water tolerance. As a result, they accomplish valuable results formerly unattainable with the usual urea-formaldehyde resins. Thus, the new products are particularly well suited for impregnating fibrous materials such as paper, cloth, wood, and the like.

The products of this invention are particularly valuable in the preparation of special kinds of paper, such as paper of high wet strength, as was shown above. In this operation, full advantage may be taken of the unusual physical and chemical properties of the resins. Thus, their extreme solubility permits their use at the wet end of the paper machine in the beater, head box, or machine chest where the resins remain in solution even in the extremely dilute aqueous mixtures used in paper making. When these highly condensed resins are used, for example, directly in the beater of a paper machine, they are highly effective because of improved adsorptivity by the cellulose fibers. The ionic charges on the resin molecules may be a further contributing factor in such applications. This is particularly true when used in conjunction with the salt of a polyvalent cation, such as aluminum sulfate, which does not, however, precipitate the resin.

The resinous products of this invention differ chemically as well as physically from all previously known condensates. They contain salt-forming sulfonate groups which impart unique properties thereto. For example, an alkali metal attached to the sulfonate group may be replaced by another metal, such as a heavy metal, either before or after the resin is converted to the infusible state. This reaction may be regarded from the point of view of metathesis, or it may be considered as a simple replacement or exchange of one cation for another. In a specific instance, a piece of pervious material, such as cloth or wood, upon being treated or impregnated with a solution of the new resins containing sodium sulfonate groups and thereafter treated with a solution of a salt of a polyvalent metal, such as copper sulfate, results in the displacement of the sodium by the copper or other polyvalent metal. Thus, the pervious material may be made to contain the polyvalent metal which imparts its own peculiar properties thereto. Various alkaline earth and heavy metal forms of the unconverted resins are insoluble in water. This characteristic is of advantage in those cases where deposition of insoluble metal forms of the resin in or on the fibers of pervious materials is desired. Aside from any properties due to the presence of a resin per se (e. g., anti-crush or improved handle), there are other advantages gained by the presence of the metal constituent. Thus, the treated material may be made to hold such metals as copper, mercury, tin, lead, and/or other metal. As a result, such properties as mildewproofness, resistance to bacterial decomposition, flameproofness, and others may be imparted to the pervious material. After the exchange of metal ions, the resin may still be heat-converted and the properties of such converted resin utilized.

Resins containing metal sulfonate groups, —$SO_3M$, in which M is an equivalent of any metallic element, may be readily converted to the infusible form by the action of heat and/or acidic agents. Among suitable acid catalysts are organic and inorganic acids, such as hydrochloric and oxalic acids, acid salts such as $NaH_2PO_4$, salts which hydrolyze to give acidic solutions, such as alum, ammonium salts such as ammonium sulfate, and so-called latent catalysts, such as chloro- or bromoacetamide, which liberate acids when heated. Combinations of ammonium salts and soluble sulfites, as disclosed in application Serial No. 448,417, filed June 25, 1942, now abandoned, may also be used.

In another method of utilization, the new resin in solution is applied to a material such as cloth, paper, asbestos, or clay. It is then converted to the infusible stage and thereafter is treated with a salt. This causes exchange of metal ions. Thus, the products of this invention have utilizable cation-exchange properties.

The products of this invention may further be used as casting and laminating resins. They may be used in conjunction with plasticizers, pigments, inert extenders, fillers, starch, cereal flours, and wood flours.

We claim:

1. As a new composition of matter, a thermosetting resinous product containing sulfonate groups, obtained by condensing at a pH of 4 to 7, as the essential reactants, (a) urea, (b) an aldehyde from the group consisting of formaldehyde, acetaldehyde, butyraldehyde, furfuraldehyde, and benzaldehyde, and (c) a water-soluble hydroxyalkane sulfonate having the general formula HO—R—$SO_3M$, in which R is an alkylene group containing two to four carbon atoms and M is a metal, at a temperature from 60° C. to 105° C., the aldehyde being present in an amount from two to three mols per mol of urea and said hydroxyalkane sulfonate being present in an amount from 0.05 to 0.5 mol per mol of aldehyde.

2. As a new composition of matter, a thermosetting resinous product containing sulfonate groups, obtained by condensing at a pH of 4 to 7, as the essential reactants, (a) urea, (b) formaldehyde, and (c) a water-soluble, hydroxyalkane sulfonate having the general formula HO—R—$SO_3M$, in which R is an alkylene group containing two to four carbon atoms and M is a metal, at a temperature from 60° C. to 105° C., the formaldehyde being present in an amount from two to three mols per mol of urea and said hydroxyalkane sulfonate being present in an amount from 0.05 to 0.5 mol per mol of formaldehyde.

3. As a new composition of matter, a thermosetting resinous product containing sulfonate groups, obtained by condensing at a pH of 4 to 7, as the essential reactants, (a) urea, (b) formaldehyde, and (c) a water-soluble, hydroxyalkane sulfonate having the general formula HO—R—SO$_3$M, in which R is an alkylene group containing two to four carbon atoms and M is an alkali metal, at a temperature from 60° C. to 105° C., the formaldehyde being present in an amount from two to three mols per mol of urea and said hydroxyalkane sulfonate being present in an amount from 0.05 to 0.5 mol per mol of formaldehyde.

4. As a new composition of matter, a thermosetting resinous product containing sulfonate groups, obtained by condensing at a pH of 4 to 7, as the essential reactants, (a) urea, (b) formaldehyde, and (c) a water-soluble, hydroxyalkane sulfonate having the general formula HO—R—SO$_3$M, in which R is an alkylene group containing two to four carbon atoms and M is an alkali metal, at a temperature from 60° to 105° C., the formaldehyde being present in an amount from two to three mols per mole of urea and said hydroxyalkane sulfonate being present in an amount from 0.1 to 0.4 mol per mol of formaldehyde.

5. As a new composition of matter, a thermosetting resinous product containing sulfonate groups, obtained by condensing at a pH of 4 to 7, as the essential reactants, (a) urea, (b) formaldehyde, and (c) sodium isethionate, at a temperature from 60° C. to 105° C., the formaldehyde being present in an amount from 2 to 3 mols per mol of urea and said sodium isethionate being present in an amount from 0.1 to 0.4 mol per mol of formaldehyde.

6. As a new composition of matter, a thermosetting resinous product containing sulfonate groups, obtained by condensing at a pH of 4 to 7, as the essential reactants, (a) urea, (b) formaldehyde, and (c) sodium hydroxypropane sulfonate, at a temperature from 60° C. to 105° C., the formaldehyde being present in an amount from 2 to 3 mols per mol of urea and said sodium hydroxypropane sulfonate being present in an amount from 0.1 to 0.4 mol per mol of formaldehyde.

ROBERT W. AUTEN.
JAMES L. RAINEY.

REFERENCES CITED

The following references are of record in the file of this patent:

UNITED STATES PATENTS

| Number | Name | Date |
|---|---|---|
| 2,227,709 | Cordier | Jan. 7, 1941 |